United States Patent [19]

Ohsaki et al.

[11] Patent Number: 5,856,043
[45] Date of Patent: Jan. 5, 1999

[54] NON-AQUEOUS ELECTROLYTE SECONDARY BATTERY

[75] Inventors: Takashi Ohsaki; Hiroshi Abe, both of Shizuoka-ken; Takeji Murai, Shinzuoka-ken, all of Japan

[73] Assignee: Nikkiso Company Ltd., Tokyo, Japan

[21] Appl. No.: 707,379

[22] Filed: Sep. 4, 1996

[30] Foreign Application Priority Data

Jun. 12, 1996 [JP] Japan ................................. 8-151417

[51] Int. Cl.⁶ ..................................................... H01M 10/40
[52] U.S. Cl. ........................... 429/218; 429/194; 429/197
[58] Field of Search ..................... 429/218, 194, 429/197

[56] References Cited

U.S. PATENT DOCUMENTS

| | | | |
|---|---|---|---|
| 4,668,595 | 5/1987 | Yoshino et al. | 429/194 |
| 5,273,842 | 12/1993 | Yamahira et al. | 429/194 |
| 5,451,477 | 9/1995 | Omaru et al. | 429/218 |
| 5,512,393 | 4/1996 | Harada et al. | 429/218 |
| 5,601,950 | 2/1997 | Yamahira et al. | 429/218 |
| 5,639,575 | 6/1997 | Omaru et al. | 429/197 |

FOREIGN PATENT DOCUMENTS

| | | |
|---|---|---|
| 424831 | 4/1992 | Japan . |
| 541251 | 2/1993 | Japan . |
| 684542 | 3/1994 | Japan . |

*Primary Examiner*—Bruce F. Bell
*Attorney, Agent, or Firm*—Browdy and Neimark

[57] ABSTRACT

The present invention relates to a non-aqueous electrolyte secondary battery. The graphitized vapor-grown carbon fibers used as an anode in the present invention have a specific surface area of at most 5 $m^2/g$ and an average aspect ratio of 2–30. The non-aqueous electrolyte secondary battery comprises an anode comprising a cathode comprising a lithium-containing complex oxide, an anode comprising the graphitized vapor-grown carbon fibers, and an electrolyte comprising a lithium salt and a solvent. The present invention provides a non-aqueous electrolyte secondary battery having a high capacity maintained over a broad temperature range, good cycle characteristics, a high safety and an improved load characteristics.

20 Claims, 1 Drawing Sheet

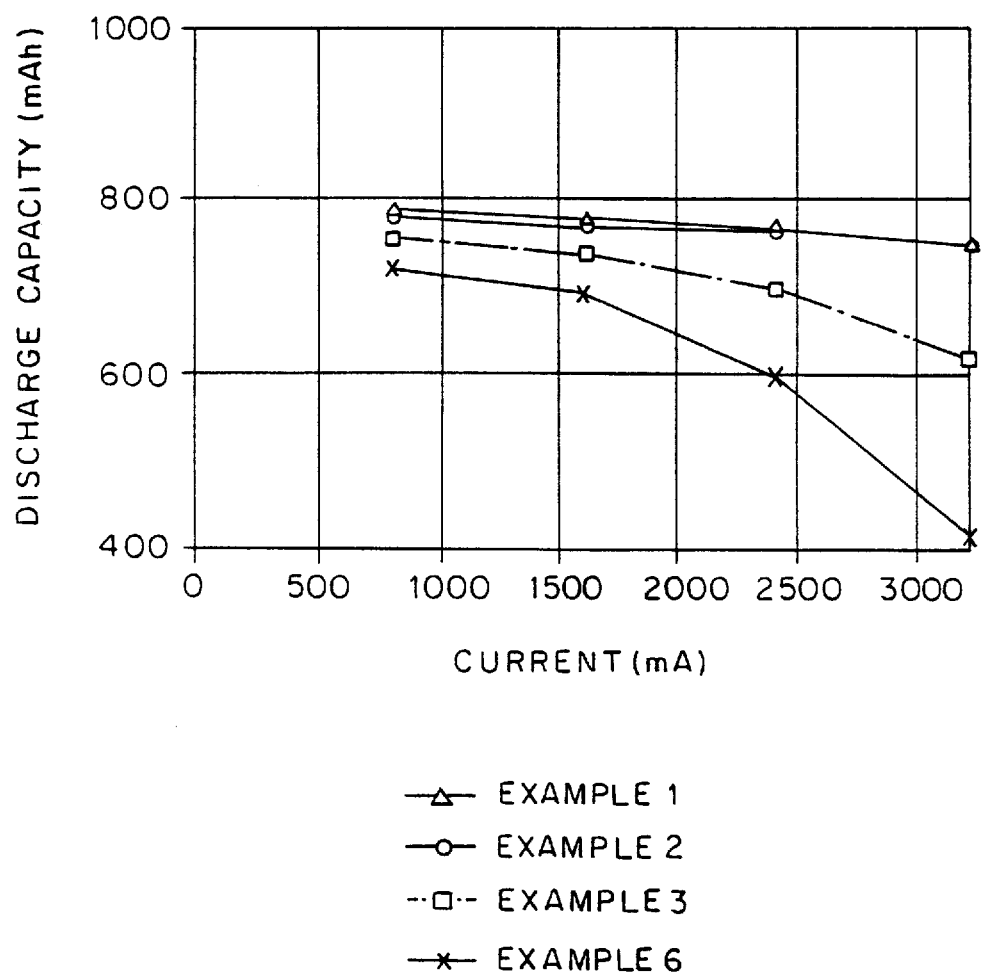

NON-AQUEOUS ELECTROLYTE SECONDARY BATTERY

BACKGROUND OF THE INVENTION

1. Field of the Invention

The present invention relates to a non-aqueous electrolyte secondary battery, more particularly to a non-aqueous electrolyte secondary battery with improved safety and load characteristics.

2. Description of Related Art

Vapor-grown carbon fibers may be produced by thermally decomposing carbon compounds at a temperature of 800°–1300° C. in the presence of ultrafine iron and nickel as catalyst. These vapor-grown carbon fibers are characterized by being easily converted into graphite by heat treatment. For example, graphitized vapor-grown carbon fibers obtained by heat treatment at a temperature exceeding 2800° C. have fewer crystal defects, a network of carbon hexagonal lattices growing tubularly around the axis of a fiber, further similar networks layered on the network outwardly and concentrically, like growth rings of a tree. Therefore, these graphitized vapor-grown carbon fibers are highly strong and elastic, and thermally and electrically conductive.

One of the applications of these graphitized vapor-grown carbon fibers is in a non-aqueous electrolyte secondary battery, in which these carbon fibers are used as an electrode active material.

A non-aqueous electrolyte secondary battery is normally comprised of an anode, separator, cathode and electrolyte. As materials used for the anode, reference may be made to natural graphite, artificial graphite, hardly-graphitizable carbon which is so-called hard carbon, mesocarbon microbeads, pitch carbon fibers and vapor-grown carbon fibers. As materials used for the cathode, reference may be made to a lithium-containing complex oxide such as lithium cobaltate ($LiCoO_2$), lithium manganate ($LiMn_2O_4$, $LiMnO_2$) and lithium nickelate ($LiNiO_2$). For the electrolyte there may be used a non-aqueous electrolyte comprising a mixture of a lithium salt and an organic solvent. As the lithium salt reference may be made to $LiClO_4$, $LiPF_6$, $LiBF_4$, $LiAsF_6$ and $LiCF_3SO_3$. As the organic solvent reference may be made to ethylene carbonate (hereinbelow often referred to as EC), propylene carbonate (hereinbelow often referred to as PC), dimethyl carbonate (hereinbelow often referred to as DMC), diethyl carbonate (hereinbelow often referred to as DEC) and methylethyl carbonate (hereinbelow often referred to as MEC).

Recently, non-aqueous electrolyte secondary batteries having excellent cycle properties have attracted attention as large-sized batteries for electric vehicles and domestic electricity storage systems.

In a lithium ion secondary battery, lithium is generally precipitated at the surface of the anode thereof in the form of needles and they sometimes pierce a separator placed between the cathode and the anode when the battery is overcharged, charging current is too heavy, or the like, so that short-circuits can easily be formed. As a result, the lithium ion secondary battery may burst or ignite. Furthermore, overcharging may cause the electrolyte to be decomposed, so that the cycle life of the lithium ion secondary battery may be reduced. On the other hand, overdischarging the battery makes a conductor having an electrode coated with active materials become dissolved, so that the cycle life of the lithium ion secondary battery is highly reduced. In order to avoid these problems, lithium ion secondary batteries are equipped with a safety device for preventing overcharging and overdischarging.

An organic solvent including a linear carbonate which has a low viscosity, e.g. a mixture of a cyclic carbonate such as ethylene carbonate and propylene carbonate with a linear carbonate, has conventionally been employed as the organic solvent for the purpose of improving a lithium ion secondary battery's properties at low temperature and cycle characteristics. Prior art lithium ion secondary batteries using such a solvent as the above-mentioned have a problem in safety. The problem in safety is that the charged batteries are broken by gases formed by decomposition of the solvent in the batteries, and then ignited, because of a high temperature of the lithium ion secondary battery caused by a heavy current when, for example, the above-mentioned short-circuits are formed, artificial short-circuits are formed in a nailing test, or the like. One of the causes is that the linear carbonate has a low boiling point and a high vapor pressure, and another that an exposed area or active reaction area of a fracture of graphite crystal in the anode promotes the decomposition of the solvent, particularly an electrolytic decomposition of propylene carbonate which leads to production of gases, in other words acts a catalyst in the decomposition, and further that if the anode has an insufficient designed capacity, then lithium will be precipitated at the anode.

Prior art lithium ion secondary batteries have unsatisfactory electric conductivity as well as poor cycle characteristics. Therefore, the art has demanded secondary batteries having good cycle characteristics as well as high stability at a high load, i.e., having a high capacity in charging and discharging at a major current.

In order to improve conductivity of the electrodes, particularly the anode, a small amount of materials for improving conductivity has been added to the electrodes. This addition, however, lowers the relative amount of active materials in an electrode, which leads to a decrease in a capacity of the battery. Further, the present inventors found that such addition itself increased unsafeness of the battery. The reason is considered to be as follows. Materials for improving conductivity have a very great specific surface ratio, which differs widely from that of vapor-grown carbon fibers. Therefore addition of a very small amount of the materials to an electrode will increase an average specific surface ratio of the active materials in the electrode.

SUMMARY OF THE INVENTION

The primary object of the present invention is to solve a problem which is caused when a linear carbonate such as dimethyl carbonate (hereinbelow often abbreviated as DMC) and diethyl carbonate (hereinbelow often abbreviated as DEC) is employed as one constituent of the mixed solvent and to provide a non-aqueous electrolyte secondary battery having an excellent safety and load characteristics.

The second object of the present invention is to provide a long-life non-aqueous electrolyte secondary battery.

The third object of the present invention is to provide a non-aqueous electrolyte secondary battery having a high safety by preventing the decomposition of the solvent.

The fourth object of the present invention is to provide a non-aqueous electrolyte secondary battery free of any tendency to burst and ignite.

The fifth object of the present invention is to provide a non-aqueous electrolyte secondary battery using a highly electrically conductive electrode and having good cycle characteristics and a high stability under a higher load, i.e., a high capacity even in charging and discharging at a major current.

The present inventors found that load characteristics of a non-aqueous electrolyte secondary battery are improved by selecting vapor-grown carbon fibers as graphite, further selecting vapor-grown carbon fibers having special properties out of the selected ones, setting a packing density of the vapor-grown carbon fibers in an electrode to within a special range, selecting substances for the electrolyte, etc. They further found that safety of a non-aqueous electrolyte secondary battery is influenced by properties of vapor-grown carbon fibers, the packing density of the vapor-grown carbon fibers in an electrode, and the ratio of the capacity of the cathode and that of the anode.

An aspect of the present invention is a non-aqueous electrolyte secondary battery comprising an anode made of a compacted body of graphitized vapor-grown carbon fibers having a specific surface area of at most 5 $m^2/g$ and an average aspect ratio of 2–30, having a packing density of 1.2–2.0 $g/cm^3$, a cathode made of a lithium-containing complex oxide and an electrolyte comprising a mixed solvent of a cyclic carbonate and a linear carbonate containing a lithium salt therein.

Another aspect of the present invention is a non-aqueous electrolyte secondary battery comprising an anode made of graphitized vapor-grown carbon fibers having a specific surface area of at most 5 $m^2/g$ and an average aspect ratio of 2–30, a cathode made of a lithium-containing complex oxide and an electrolyte comprising a mixed solvent of a cyclic carbonate and a linear carbonate containing a lithium salt therein, wherein the capacity of the anode is greater than that of the cathode.

BRIEF DESCRIPTION OF THE DRAWINGS

FIG. 1 is a graph showing a relation between current and discharge capacity in the charging-discharging cycle tests in accordance with Examples 1, 2, 3 and 6.

DETAILED DESCRIPTION OF PREFERRED EMBODIMENTS

(1) Anode

The anode used in the non-aqueous electrolyte secondary battery may have a compacted body comprising pressed graphitized vapor-grown carbon fibers.

Furthermore, the anode may preferably be shaped from a compacted body comprising an electric conductor coated with active materials, the active materials forming an active material layer on the surface of the conductor. The active materials are comprised of the graphitized vapor-grown carbon fibers bonded to each other by a binder.

(1—1) Graphitized Vapor-grown Carbon Fibers

The graphitized vapor-grown carbon fibers used for an anode in the present invention has a specific surface area of at most 5 $m^2/g$, preferably at most 3 $m^2/g$, more preferably at most 2 $m^2/g$. If the specific surface area exceeds 5 $m^2/g$, the objects of the present invention cannot be achieved, and the charge and discharge efficiency and/or cycle life is reduced to such an extent that the battery cannot be put into practice. In the other words, if the graphitized vapor-grown carbon fibers have a specific surface area of not more than 5 $m^2/g$, they are advantageous compared with a plate-like graphite, a spherical graphite is such as mesocarbon microbeads and a mesocarbon fiber. The reason is as follows. A graphitized vapor-grown carbon fiber has tubular networks of carbon hexagonal lattices, which networks are layered concentrically with the axis of the fiber, like growth rings of a tree. A graphitized vapor-grown carbon fiber which has been cut so as to have an aspect ratio of 2–30 has exposed parts of fracture of the graphite crystal, or the carbon lattices, only on the both ends, which lowers the fiber's function of catalyzation of the electrolysis of the solvent. On the other hand, when a plate-like graphite is used, all of the sides are the exposed parts of fracture of the graphite crystal and when other shapes of graphite are used, almost all of the surface are the exposed parts. Therefore, these graphites deteriorate the battery in safety.

Further, if the specific surface area of the graphitized vapor-phase grown carbon fibers is at most 5 $m^2/g$, acceleration or catalyzation of the decomposition of the solvent with the exposed area of fracture of the graphite crystal, i.e., the fracture active reaction area of the anode can greatly be prevented.

When the specific surface area exceeds 5 $m^2/g$, a large amount of white smoke to such an extent that the cathode cap is broken may be emitted if both the electrodes should make a short circuit.

To the contrary, if the specific surface area is at most 5 $m^2/g$, an amount of smoke can greatly be decreased and the cap can be prevented from being broken.

In addition, when a graphitized vapor-grown carbon fiber is used in a specific packing density, conductivity of the anode increases. Thus, addition of materials for improving conductivity, such as acetylene black, which is a high conductive carbon black having a remarkably great specific surface area, is not necessary, which leads to a marked increase of safety of the battery.

The specific surface area may be determined by the BET method.

The average aspect ratio of the graphitized vapor-phase grown carbon fibers is in the range of 2–30, preferably 3–20, more preferably 5–15. If the average aspect ratio is in the specified range, then the objects of the present invention can be achieved well. In other words, when the average aspect ratio exceeds 30, then there occurs such inconvenience that the electrode cannot be formed in a sheet and a packing density of the anode is lowered, which leads to deterioration in load characteristics and safety. If the average aspect ratio is less than 2, then the specific surface area is inconveniently more than 5 $m^2/g$.

If the average aspect ratio is in the range of 2–30, the graphitized vapor-phase grown carbon fibers are brought in contact with each other to such an extent that the electrode itself can have a high electric conductivity. This does not cause any great potential difference between the current collector and the surface of the electrode even when a heavy current flows at a high load. That is, uniform charging-discharging between the core and the surface of the electrode is possible, so that the charge capacity and the discharge capacity are increased. Thus, the present invention can provide a non-aqueous electrolyte secondary battery exhibiting a high capacity in charging and discharging at a heavy current.

If the average aspect ratio is less than 2, the contact resistance is so large that the electric conductivity is reduced. If the average aspect ratio exceeds 30, then the packing density of the electrode is lowered, so that the electric conductivity of the electrode decreases. When the average aspect ratio is less than 2 or exceeds 30, the electric conductivity of the electrode decreases, which results in decrease in performance of the battery. As mentioned above, in the prior art the materials for improving conductivity had to be added in order to make conductivity of the electrode greater. When the average aspect ratio is within the range, electric conductivity of the electrode itself becomes increased. Thus, addition of the materials for improving conductivity can be obviated and a non-aqueous electrolyte secondary battery with improved safety can be provided.

The graphitized vapor-grown carbon fibers normally have an average diameter of 1–10 μm, preferably 2–5 μm. The average diameter in the range of 1–10 μm allows the dispersion of the fibers with a binder in an organic solvent to easily be realized and the fibers to be easily brought into contact with each other. This leads to increase in conductivity of the anode with a specific packing density so that it is unnecessary to add carbon black which is a material for improving conductivity, e.g. acetylene black. Surprisingly, conductivity of the anode according to the present invention is greater than that of an anode made of other graphites with addition of the materials for improving conductivity. The anode of the invention has no increase in a specific surface area which would be caused by adding the materials. Both of the advantages lead to a increased safety of the non-aqueous electrolyte secondary battery.

The average aspect ratio of the graphitized vapor-grown carbon fibers is determined by taking electron microphotographs of one thousand samples of the carbon fibers selected at random, measuring the length and the diameter of the selected carbon fibers, on the supposition that these carbon fibers are in a tubular form, calculating the aspect ratio from the length and the diameter for each sample, and averaging the calculated thousand aspect ratios. The average diameter of the carbon fibers is determined by measuring the diameter of the selected carbon fibers, and averaging the measurements of one thousand samples.

The graphitized vapor-grown carbon fibers used in the present invention have a graphite crystal structure developed to a high degree and normally have a graphite network distance ($d_{002}$), which is a distance between adjacent networks, of at most 0.338 nm, preferably at most 0.337 nm, more preferably 0.3355–0.3365 nm, in view of the degree of development of a graphite network having a pattern of multiple hexagonal rings.

Furthermore, the graphitized vapor-grown carbon fibers used in the present invention have a thickness of the layered graphite networks, i.e., a thickness of a crystallite (Lc) normally of at least 40 nm, preferably 60 nm, more preferably 80 nm.

The graphitized vapor-grown carbon fibers having a graphite network distance exceeding 0.338 nm, or a thickness of a graphite crystallite of less than 40 nm do not intercalate a sufficient amount of lithium ions and, therefore, are sometimes inconveniently used as an anode for lithium ion secondary batteries.

The graphite network distance and the thickness of the crystallite may be determined by the "Gakushinhou" method, which is proposed by Japan Society for the Promoting of Science, and is described on page 55 of "Tanso Gijutsu (Carbon Technology) I" published by Kagaku Gijutsu Shuppansha, 1970.

The graphitized vapor-grown carbon fibers used in the present invention has a spin density preferably in the range of at greatest $8 \times 10^{18}$ spins/g, more preferably at greatest $7 \times 10^{18}$ spins/g, as determined by the electron spin resonance absorption method.

The graphitized vapor-grown carbon fibers specified by the present invention may preferably be produced by fracturing starting graphitized vapor-grown carbon fibers in some form at a high impact strength or pressing the carbon fibers under hydrostatic pressure.

The graphitized vapor-grown carbon fibers can be produced by graphitizing carbon fibers obtained by vapor-growth.

The vapor-grown carbon fibers can be produced by a vapor-growth method.

Specifically, the vapor-grown carbon fibers may be produced by the methods described in JP-A-52-107320, JP-A-57-117622, JP-A-58-156512, JP-A-58-180615, JP-A-60-185818, JP-A-60-224815, JP-A-60-231821, JP-A-61-132630, JP-A-61-132600, JP-A-61-132663, JP-A-61-225319, JP-A-61-225322, JP-A-61-225325, JP-A-61-225327, JP-A-61-225328, JP-A-61-275425, JP-A-61-282427 and JP-A-5-222619.

The graphitized vapor-grown carbon fibers may be produced by heat treating the starting vapor-grown carbon fibers at a temperature in the range of not lower than 2000° C., preferably 2000° C.–3000° C.

Fine starting vapor-grown carbon fibers which are not greater than 70 nm in diameter sometimes have graphite crystals or carbon lattices having sufficiently been grown when they are produced by the above-mentioned methods. The fine starting vapor-grown carbon fibers can be used for the anode without the heat treating, as well as the graphitized vapor-grown carbon fibers.

Normally, the atmosphere for the heat treatment may be an inert gas, and the heat treating time may be 5 minutes or more.

(1-2) Binder

As the binder used, reference may be made to a fluorinated resin such as polyvinylidene fluoride and polytetrafluoroethylene, a polyolefin such as polyethylene and polypropylene, and copolymers thereof.

(1-3) Electric Conductor

The electric conductor used should preferably be made of a material having a function for supporting the electrodes, and be resistant to chemicals and chemically and electrically stable. It may normally be made of a metal such as copper, aluminum and iron, particularly preferably copper and aluminum. Normally, copper is more preferred for the conductor of the anode and aluminum is more preferred for that of the cathode. The shape of the conductor varies depending that of the batteries, but is normally a thin sheet.

(1-4) Method of producing the Anode

A method of producing the anode used in the present invention comprises firstly dispersing the graphitized vapor-grown carbon fibers together with the binder into the organic solvent, then coating the surface of the electric conductor with the resulting dispersion, and drying and pressing the coated conductor. The anode thus obtained has the active material which is applied and compacted on the surface of the electric conductor.

The solvent used is preferably a polar solvent, particularly preferably a non-aqueous polar solvent such as N-methyl-2-pyrrolidone. The dispersion has a viscosity of 20–70 dpa·s, preferably 25–60 dpa·s, more preferably 35–50 dpa·s adjusted with the solvent.

When the dispersion is applied onto the electric conductor, the thickness and surface area of the coating varies depending upon the size of the batteries. Coating methods such as brushing, dipping, coating with a coater or spraying may properly be adopted.

After the dispersion is applied onto the electric conductor, the coating is dried. The drying atmosphere may preferably be a deoxidized atmosphere containing an oxygen content of at most 100 ppm, preferably at most 80 ppm, more preferably at most 50 ppm. The deoxidized atmosphere is preferred since the oxidization of the electric conductor is inhibited even at a high temperature. The drying time in the deoxidized atmosphere is normally in the range of 5–60 minutes, preferably 10–40 minutes. The drying temperature is normally 100°–180° C., preferably 120°–160° C.

The dispersion-coated and dried electric conductor is pressed. The pressing apparatus used may be a pressing machine or roll pressing machine. When the roll pressing machine is used, the pressing should preferably be made with a clearance of 40–60% of the thickness of the anode active material layer.

The packing density of the compact thus pressed is in the range of 1.2–2.0 g/cm$^3$, preferably 1.4–2.0 g/cm$^3$, more preferably 1.5–1.8 g/cm3. If the packing density is less than 1.2 g/cm$^3$, electric conductivity of the electrode becomes lowered and advantages of the secondary battery in load characteristics and safety cannot sufficiently be enjoyed. On the other hand, if the packing density is in the range of 1.2–2.0 g/cm$^3$, then the object of the present invention can sufficiently be achieved.

The anode active material layer of the present invention is comprised of the graphitized vapor-grown carbon fibers bonded to each other by the binder. The proportion of the graphitized vapor-grown carbon fibers in the anode active material layer is normally 85–97%, preferably 87–95%, of the anode active material layer.

(2) Cathode

The cathode used for the non-aqueous electrolyte secondary battery of the present invention is comprised of a lithium-containing complex oxide. Preferred cathodes are formed by coating an electric conductor with an active material layer comprising a lithium-containing complex oxide and a dispersed in a binder.

As the lithium-containing complex oxide reference may be made to complex oxides containing lithium and at least one metal selected from the group consisting of Groups 3B, 6A, 7A and 8 of the Periodic Table. A preferred lithium-containing complex oxide is at least one selected from the group consisting of LiMn$_2$O$_4$ and a lithium complex oxide as represented by the following general formula:

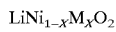

$$LiNi_{1-x}M_xO_2$$

wherein M is aluminum, manganese, chromium, cobalt or iron, and X is a real number of 0–1.

More preferred are lithium cobaltate (LiCoO$_2$), lithium manganate (LiMn$_2$O$_4$) and lithium nickelate (LiNiO$_2$). The lithium-containing complex oxides may be used singly or in combination.

As the electrically conductive inorganic material reference may be made to, for example, acetylene black and artificial graphite, a carbon black called KETJENBLACK and produced by KETJENBLACK INTERNATIONAL Inc., or vapor-grown carbon fibers.

The binder material and the electric conductor material may be the same as used for the anode, and these materials used for the anode and the cathode may be identical to or different from each other.

The cathode may be produced by firstly dispersing the lithium-containing complex oxide as active material and the binder in the solvent, and coating the surface of the electric conductor with the resulting dispersion, and drying and pressing the coated conductor. The shape of the cathode is not particularly limited.

The solvent may be the same as used for the anode, preferably such as N-methyl-2-pyrrolidone. In dispersing the lithium-containing complex oxide into the solvent, the proportion of the lithium-containing complex oxide to the solvent is normally in the range of 50–70 wt %, preferably 55–65 wt %. The solvent used for the cathode may be the same with or different from that used for the anode.

The thickness and the surface area of the applied active material, coating method, drying method and pressing method may be the same as those in producing the anode.

The cathode active material comprises the lithium-containing complex oxide, electrically conductive inorganic material and the binder. The proportion of the lithium-containing complex oxide is normally in the range of 80–95 wt %, preferably 85–92 wt % of the total weight of the cathode active material. The proportion of the electrically conductive inorganic material is normally in the range of 15–3 wt %, preferably 8–4 wt % of the total weight of the cathode active material.

The conductor to be coated thereon with the dispersion is normally a sheet of a metal, preferably aluminum.

The drying method is not particularly limited and can be chosen depending upon various conditions or requirements.

The cathode is desirably formed so that it has a packing density of 2.2–3.5 g/cm$^3$, preferably 2.5–3.3 g/cm$^3$.

(3) Production of Secondary Batteries

The secondary battery of the present invention can be produced using an anode, a cathode and a non-aqueous electrolyte as described above.

The non-aqueous electrolyte contains a lithium salt. The concentration of the lithium salt is normally in the range of 0.8–2.0 mol/liter, preferably 1–1.8 mol/liter, more preferably 1–1.6 mol/liter. If the concentration of the lithium salt is within the above-mentioned range, then the object of the present invention can satisfactorily be achieved, and good cycle characteristics can advantageously be obtained at high and low temperatures.

As the lithium salt reference may be made to, for example, LiClO$_4$, LiPF$_6$, LiBF$_4$, LiAsF$_6$ and LiCF$_3$SO$_3$. These salts may be used singly or in combination. Of these salts is preferably used LiPF$_6$.

The solvent for the non-aqueous electrolyte is a cyclic carbonate/linear carbonate mixture.

The cyclic carbonate may be ethylene carbonate, propylene carbonate, butylene carbonate, etc., which may be used singly or in combination. The linear carbonate may be dimethyl carbonate, diethyl carbonate, methylethyl carbonate, etc., which may be used singly or in combination. For example, such combination may be ethylene carbonate/dimethyl carbonate, ethylene carbonate/diethyl carbonate, ethylene carbonate/dimethyl carbonate/diethyl carbonate, ethylene carbonate/propylene carbonate/dimethyl carbonate, or ethylene carbonate/propylene carbonate/diethyl carbonate, etc.

These mixed solvents may include such an amount of other additives that they do not damage the object of the present invention.

The mixing ratio by volume of ethylene carbonate/propylene carbonate/diethyl carbonate may be in the range of 2–5/0.5–3.0/2.5–7.5. The mixing ratio by volume of ethylene carbonate/propylene carbonate/dimethyl carbonate may be in the range of 2–5/1–3/2–7.

The mixed solvent containing the three or more components can satisfactorily achieve the object of the present invention, and a higher ion conductivity can advantageously be obtained even at a lower temperature.

In the non-aqueous electrolyte secondary battery of the present invention, the capacity of the anode, i.e. the designed capacity is adjusted to be larger than that of the cathode. The designed capacity may be calculated from the charging capacity per unit weight of electrode active material determined in a three electrode-type cell or coin-shaped cell with lithium metal used as reference or opposite electrode and the total amount of the active material. Provided the designed capacity of the cathode is the unit 1 that of the anode should desirably be adjusted to over 1 to 1.6, preferably 1.05–1.4, to provide a non-aqueous electrolyte secondary battery having an improved safety.

The designed capacity of the cathode is based on the whole quantity of lithium ions contained in the cathode, the lithium ions being released from and absorbed into, when the lithium-containing complex oxide has a spinel structure. Examples of the spinel-structured lithium-containing complex oxide are $LiMnO_2$, etc. On the other hand, when the lithium-containing complex oxide does not have a spinel structure, the designed capacity of the cathode is based on the half quantity of lithium ions contained in the cathode. If the whole quantity of lithium ions contained in the cathode are released from the cathode, the crystal structure of the non-spinel-structured lithium-containing complex oxide can be destroyed, which leads to deterioration of cycle characteristics of the lithium secondary battery. Therefore cut-off voltage in charging and discharging should be adjusted accordingly. Examples of the non-spinel-structured lithium-containing complex oxide are $LiCoO_2$, $LiNiO_2$, etc.

As for the anode, the designed capacity of the anode may be based on a theoretical capacity, i.e. 372 mAh/g–372 mAh per one gram of carbon in the anode, when the active materials of the anode are completely graphitized. If the active materials are not completely graphitized, the designed capacity of the anode is determined by measuring the capacity by a charge with a small current of not greater than 10 mAh/g to a predetermined cut-off voltage.

In using lithium nickelate ($LiNiO_2$) as the cathode active material, use of the cyclic/linear carbonate mix solvent allows the charge and discharge efficiency in the first cycle to be reduced to 50–70% and provide a non-aqueous electrolyte secondary battery with a reduced deterioration of discharge capacity.

Furthermore, in the non-aqueous electrolyte secondary battery of the present invention the cut-off voltage in charging is desirably limited to 4.1 V to provide the battery with a longer life. The cut-off voltage in the charging is the upper limit of voltage during the charging process.

The non-aqueous electrolyte secondary battery of the present invention may include a button-shaped battery, cylindrical battery, rectangular battery, coin-shaped battery, etc.

The cylindrical battery may be produced in the following manner.

A anode and the cathode as mentioned above are wound up in a roll form putting between the anode and the cathode a separator of a porous sheet of polypropylene. The resulting wound roll is placed in a cylindrical battery container. An anode leading wire is welded on the bottom of the container. Then, a cathode leading wire is welded on a cathode cap comprising a safety rupture plate, closing cover and gasket. The electrolyte is placed in the container and the cathode cap is caulked on the opening of the container as anode. Thus, the battery is obtained.

A rectangular battery may be produced in the following manner. The wound roll made in the same manner as in the cylindrical battery is flattened and placed in a rectangular container. Alternatively, cathodes and anodes having leading wires welded thereon are alternately stacked on one another putting a separator between each cathode and each anode in a sandwich form and placed in the rectangular container.

The present invention will be illustrated below with reference to some examples and drawings.

Example 1

1) Production of Graphitized Vapor-Grown Carbon Fibers for Anode:

Vapor-grown carbon fibers having an average diameter of 2 μm and an average length of 50 μm were graphitized in an argon gas atmosphere at 2800° C. for 30 minutes to prepare graphitized vapor-grown carbon fibers.

40g of the graphitized vapor-grown carbon fibers were placed in a hybridizer, NHS-1, made by K.K. Nara Kikai Seisakusho, and subjected to the high impact treatment at 4000 rpm with a peripheral speed of 50 m/s for 2 minutes.

The treated graphitized vapor-grown carbon fibers had a specific surface area of 1.4 $m^2$/g, an average aspect ratio of 12, an average diameter of 2 μm, a graphite network lattice distance ($d_{002}$) of 0.3361 nm and a graphite crystallite thickness (Lc) of 130 nm. The graphitized vapor-grown carbon fibers after the treatment are those of the present invention. The specific surface area and the average aspect ratio are shown in Table 1.

2) Cylindrical Battery:

The anode was prepared in the following manner. 30 g of polyvinylidene fluoride (PVDF) was dissolved in 420 ml of N-methyl-2-pyrrolidone. To the resulting solution was added 270 g of the graphitized vapor-phase grown carbon fibers for the anode obtained in the above 1), which was fully dispersed with an ultrasonic disperser. A copper-made sheet of 10 μm in thickness, 3 m in length and 200 mm in width was coated with the resulting dispersion, which was dried and then pressed to form an electrode. The electrode was cut in a size of 39 mm in width and 450 mm in length. By measuring thickness and weight the electrode, a packing density of it was calculated at 1.60g/$cm^3$. This electrode was used as the anode. The packing density of the anode is shown in Table 1.

The cathode was prepared in the following manner. 20 g of PVDF was dissolved in 350 ml of N-methyl-2-pyrrolidone to prepare a solution.

Then, 445 g of $LiCoO_2$, 20 g of artificial graphite and 15 g of acetylene black were ball milled to prepare a mixture.

The solution and the mixture were mixed and fully dispersed with an ultrasonic disperser to prepare a dispersion.

An aluminum sheet of 20 μm thick was coated with the dispersion in a surface area of 300 cm×15 cm.

The dispersion-coated electrode was pressed on the aluminum sheet to form an electrode and the electrode was cut in a size of 38 mm in width and 430 mm in length. By measuring thickness and weight of the electrode, a packing density of it was calculated at 3.1 g/$cm^3$. This electrode was used as the cathode.

The non-aqueous electrolyte secondary battery was produced in the following manner. The obtained cathode and anode were wound up in roll shape putting between the cathode and the anode a separator of a porous polypropylene sheet. The coil obtained in a roll shape was placed in a cylindrical container of 16 mm in diameter and 50 mm in height, and an anode leading wire was welded on the bottom of the container. Then, a cathode leading wire was welded on a cathode cap having a safety rupture plate, a closing cover and gasket. An electrolyte comprising a mixed solution of ethylene carbonate (EC), propylene carbonate (PC) and diethyl carbonate (DEC) with an EC/PC/DEC volume ratio of 2/1/2 containing 1 mol/l of $LiPF_6$ dissolved therein was placed in the container. The cathode cap was caulked on the opening of the anode container. Thus, a cylindrical non-aqueous electrolyte secondary battery was obtained. A ratio of the designed capacity of the anode to that of the cathode is adjusted to 1.2 and the value is shown in Table 1.

3) Nailing Test for Cylindrical Secondary Battery:

A nail of 35 mm in length and 3 mm in diameter was penetrated at a speed of 50 mm/minute through the side wall of the cylindrical secondary battery charged at a current of 800 mA to 4.1 V. The result is shown in Table 2.

4) Charging-Discharging Test at Various Currents:

Charging-discharging tests were performed at a charge and discharge voltage of 2.5–4.1 V and at each current of 800 mA, 1600 mA, 2400 mA and 3200 mA. The results are shown in Table 3 and in FIG. 1.

Example 2

1) Production of Graphitized Vapor-Grown Carbon Fibers for Anode:

30 g of the same non-cut graphitized vapor-grown carbon fibers as in Example 1 were pressed at a pressure of 1000 kgf/cm$^2$ by an hydrostatic pressing means.

The pressed fibers had a specific surface area of 2.4 m$^2$/g, an average aspect ratio of 8, an average diameter of 2 μm and a graphite network lattice distance ($d_{002}$) of 0.3361 nm and a graphite crystallite thickness (Lc) of 130 nm. The pressed graphitized vapor-grown carbon fibers are those of the present invention for an anode. The specific surface area and the average aspect ratio are shown in Table 1.

2) Cylindrical Battery:

The anode was prepared in substantially the same manner as in Example 1. The packing density of the anode was 1.80 g/cm$^3$. The packing density is shown in Table 1.

The cathode was prepared in the same manner as in Example 1, except that LiMn$_2$O$_4$ was used in place of LiCoO$_2$ and the packing density was 2.9 g/cm$_3$.

The non-aqueous electrolyte secondary battery was prepared in the same manner as in Example 1, using the anode above, cathode above and the same electrolyte as in Example 1. A ratio of the designed capacity of the anode to that of the cathode was adjusted to 1.1 and the value is shown in Table 1.

The same nailing test and charging-discharging test as in Example 1 were performed. The results are shown in Tables 2 and 3, and FIG. 1.

Example 3

1) Production of Graphitized Vapor-Grown Carbon Fibers for Anode:

Vapor-grown carbon fibers having an average diameter of 4 μm and an average length of 50 μm were graphitized in an argon gas atmosphere at 2800° C. for 30 minutes to prepare graphitized vapor-grown carbon fibers.

40 g of the graphitized vapor-grown carbon fibers were placed in a hybridizer, NHS-1 made by K.K. Nara Kikai Seisakusho, and subjected to the high impact treatment at 8,000 rpm with a peripheral speed of 100 m/s for 10 minutes.

The treated graphitized vapor-phase grown carbon fibers had a specific surface area of 7.0 m$^2$/g, an average aspect ratio of 1.2, an average diameter of 4 μm, graphite network lattice distance ($d_{002}$) of 0.3370 and a graphite crystallite thickness (Lc) of 60 nm. The specific surface area and the average aspect ratio are shown in Table 1.

2) Cylindrical Battery:

An anode was prepared in substantially the same manner as in Example 1. A packing density of the anode was 1.1 g/cm$^3$. The packing density is shown in Table 1.

A non-aqueous electrolyte secondary battery was prepared in the same manner as in Example 1, using the anode above, the same cathode and the same electrolyte as in Example 1. A ratio of a designed capacity of the anode to that of the cathode was adjusted to 1.1 and the value is shown in Table 1.

The same nailing test and charging-discharging test as in Example 1 were performed. The results are shown in Tables 2 and 3, and FIG. 1.

Example 4

A cylindrical non-aqueous electrolyte secondary battery was prepared in the same manner as in Example 3, except that the packing density of the anode was changed to 0.9 g/cm$^3$ and the ratio of the designed capacity of the anode to that of the cathode was changed to 0.6.

A specific surface area and an average aspect ratio of the cut graphitized vapor-grown carbon fibers in this example is shown in Table 1.

The ratio of the designed capacity of the anode to that of the cathode is shown in Table 1.

The same nailing test as in Example 3 was performed. The results are shown in Table 2.

Example 5

A cylindrical non-aqueous electrolyte secondary battery was prepared in the same manner as in Example 1, except that a mixture of graphitized mesocarbon microbeads (hereinbelow often referred to as MCMB) having an average particle size of 6 μm and acetylene black (hereinbelow often referred to as AB) in the weight ratio of MCMB to AB being 80:10 was used in place of the graphitized vapor-grown carbon fibers. A specific surface area of the mixture was 6.0 m$^2$/g. A packing density of the anode was 1.1 g/cm$^3$. A ratio of the designed capacity of the anode to that of the cathode in the obtained non-aqueous electrolyte secondary battery was 0.8.

The values of the specific surface area, the packing density and the ratio of the designed capacity of the anode to that of the cathode are shown in Table 1.

The same nailing test as in Example 1 was performed. The results are shown in Table 2.

Example 6

A cylindrical non-aqueous electrolyte secondary battery was prepared in the same manner as in Example 1, except that graphitized mesocarbon microbeads having an average particle size of 6 μm were used in place of the graphitized vapor-grown carbon fibers.

The same charging-discharging test as in Example 1 was performed. The results are shown in Table 3 and FIG. 1.

TABLE 1

|  | Specific surface area (m$^2$/g) | Aspect ratio | Packing density of anode (g/cm$^3$) | Ratio of designed capacity of anode to that of cathode |
|---|---|---|---|---|
| Example 1 | 1.4 | 12 | 1.6 | 1.2 |
| Example 2 | 2.4 | 8 | 1.8 | 1.1 |
| Example 3 | 7.0 | 1.2 | 1.1 | 1.1 |
| Example 4 | 7.0 | 1.2 | 0.9 | 0.6 |
| Example 5 | 6.0 | — | 1.1 | 0.8 |

TABLE 2

|  | Rupture of positive electrode cap | Ignition | Smoking |
| --- | --- | --- | --- |
| Example 1 | No | No | No |
| Example 2 | No | No | No |
| Example 3 | Yes | No | No |
| Example 4 | Yes | Yes | Yes |
| Example 5 | Yes | No | Yes |

TABLE 3

| | 50th-cycle discharge capacity (mAh) | | | |
| --- | --- | --- | --- | --- |
| Current | 800 mA | 1600 mA | 2400 mA | 3200 mA |
| Example 1 | 790 | 780 | 770 | 755 |
| Example 2 | 780 | 770 | 760 | 750 |
| Example 3 | 760 | 740 | 700 | 620 |
| Example 6 | 730 | 700 | 600 | 420 |

What is claimed is:

1. A non-aqueous electrolyte secondary battery which comprises:

an anode comprising a pressed compact of graphitized vapor-grown carbon fibers having a specific surface area of at most 5 m$^2$/g and an average aspect ratio of 2–30, said compact having a packing density of 1.2–2.0 g/cm$^3$;

a cathode comprising a lithium-containing complex oxide; and an electrolyte comprising a mixed solvent of a cyclic carbonate and a linear carbonate including a lithium salt dissolved therein.

2. A non-aqueous electrolyte secondary battery according to claim 1, wherein said lithium-containing complex oxide contains lithium and at least one metal selected from the group consisting of Groups 3B, 6A, 7A and 8 of the Periodic Table.

3. A non-aqueous electrolyte secondary battery according to claim 1, wherein said lithium-containing complex oxide is selected from the group consisting of LiMn$_2$O$_4$ and a lithium complex oxide represented by the following general formula:

$$LiNi_{1-x}M_xO_2$$

wherein M is aluminum, manganese, chromium, cobalt or iron, and X is a real number of 0–1.

4. A non-aqueous electrolyte secondary battery according to claim 1, wherein said specific surface area of said graphitized vapor-grown carbon fibers is at most 3 m$^2$/g.

5. A non-aqueous electrolyte secondary battery according to claim 1, wherein said specific surface area of said graphitized vapor-grown carbon fibers is at most 2 m$^2$/g.

6. A non-aqueous electrolyte secondary battery according to claim 1 wherein said graphitized vapor-grown carbon fibers have an average diameter of 2–5 μm.

7. A non-aqueous electrolyte secondary battery according to claim 1, wherein said graphitized vapor-grown carbon fibers have a graphite network distance of 0.3355 to 0.3365 nm and a crystallite thickness of at least 40 mm.

8. A non-aqueous electrolyte secondary battery according to claim 1 wherein said packing density is 1.4–2.0 g/cm$^3$.

9. A non-aqueous electrolyte secondary battery according to claim 1 wherein said packing density is 1.5–1.8 g/cm$^3$.

10. A non-aqueous electrolyte secondary battery according to claim 1, wherein said graphitized vapor-grown carbon fibers comprise 85–97% of said anode.

11. A non-aqueous electrolyte secondary battery according to claim 1, wherein said graphitized vapor-grown carbon fibers comprise 87–95% of said anode.

12. A non-aqueous electrolyte secondary battery which comprises:

an anode formed from graphitized vapor-grown carbon fibers having a specific surface area of at most 5 m$^2$/g and an average aspect ratio of 2–30;

a cathode comprising a lithium-containing complex oxide; and an electrolyte comprising a mixed solvent of a cyclic carbonate and a linear carbonate containing a lithium salt dissolved therein, wherein the designed capacity of said anode being greater than that of said cathode.

13. A non-aqueous electrolyte secondary battery according to claim 12, wherein a ratio of the designed capacity of the anode to that of the cathode is over 1 to 1.6.

14. A non-aqueous electrolyte secondary battery according to claim 12, wherein said lithium-containing complex oxide contains lithium and at least one metal selected from the group consisting of Groups 3B, 6A 7A and 8 of the Periodic Table.

15. A non-aqueous electrolyte secondary battery according to claim 12, wherein said lithium-containing complex oxide is selected from the group consisting of LiMn$_2$O$_4$ and a lithium complex oxide represented by the following general formula:

$$LiNi_{1-x}M_xO_2$$

wherein M is aluminum, manganese, chromium, cobalt or iron, and X is a real number of 0–1.

16. A non-aqueous electrolyte secondary battery according to claim 12, wherein said specific surface area of said graphitized vapor-grown carbon fibers is at most 3 m$^2$/g.

17. A non-aqueous electrolyte secondary battery according to claim 12, wherein said specific surface area of said graphitized vapor-grown carbon fibers is at most 2 m$^2$/g.

18. A non-aqueous electrolyte secondary battery according to claim 12 wherein said graphitized vapor-grown carbon fibers have an average diameter of 2–5 μm.

19. A non-aqueous electrolyte secondary battery according to claim 12, wherein said graphitized vapor-grown carbon fibers have a graphite network distance of 0.3355 to 0.3365nm and a crystallite thickness of at least 40 mm.

20. A non-aqueous electrolyte secondary battery according to claim 12, wherein said anode has a capacity ratio to that of the cathode of 1.05 to 1.4.

* * * * *